United States Patent [19]

Matsumoto et al.

[11] Patent Number: 4,731,207
[45] Date of Patent: Mar. 15, 1988

[54] METHOD FOR MANUFACTURE OF HIGH-FREQUENCY DIELECTRIC CERAMICS

[75] Inventors: Kazutoshi Matsumoto, Matsudo; Koh Takada; Takehiro Hyuga, both of Ichikawa, all of Japan

[73] Assignee: Sumitomo Metal Mining Company Limited, Tokyo, Japan

[21] Appl. No.: 793,108

[22] Filed: Oct. 30, 1985

[30] Foreign Application Priority Data

Oct. 30, 1984 [JP] Japan .................. 59-228557

[51] Int. Cl.$^4$ .................................... C04B 35/00
[52] U.S. Cl. ........................... 264/25; 264/65; 264/66; 264/57
[58] Field of Search .................. 264/65, 66, 25, 57

[56] References Cited

U.S. PATENT DOCUMENTS 4,487,842 12/1984 Nomura et al. ............... 264/65
4,490,319 12/1984 Lee et al. ..................... 264/66

FOREIGN PATENT DOCUMENTS 53-60544  5/1978  Japan .
54-77000  6/1979  Japan .
54-71400  6/1979  Japan .
58-206003 12/1983 Japan .

*Primary Examiner*—James Derrington
*Attorney, Agent, or Firm*—Watson, Cole, Grindle & Watson

[57] ABSTRACT

A dielectric ceramics possessing a high level of unloaded Q and low loss at high frequency beneficial for communications at high frequency is produced by a method which comprises heating a green compact of a composition represented by the general formula: $xBaO \cdot yMgO \cdot zTa_2O_5$ (wherein x, y, and z satisfy $0.5 \leq x \leq 0.7$, $0.15 \leq y \leq 0.25$, $0.15 \leq z \leq 0.25$, and $x+y+z=1$) to a temperature in the range of 1,500° to 1,700° C. at a temperature increasing rate of 100° to 1,600° C./minute and subsequently retaining the green compact at the temperature for not less than 30 minutes.

12 Claims, 1 Drawing Figure

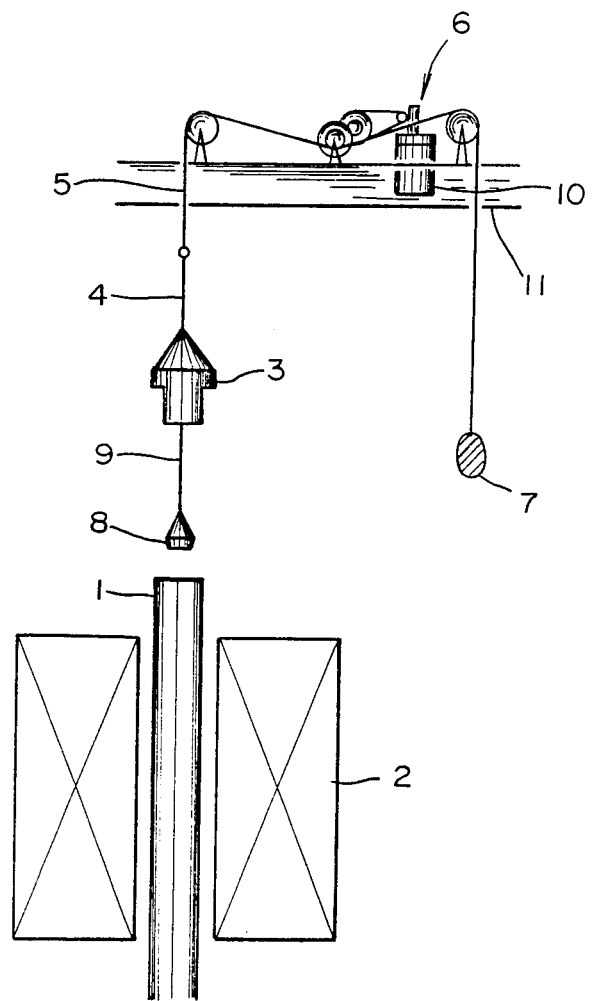

METHOD FOR MANUFACTURE OF HIGH-FREQUENCY DIELECTRIC CERAMICS

BACKGROUND OF THE INVENTION

1. Field of the Invention

This invention relates to a method for the manufacture of high-frequency dielectric ceramics, and more particularly to a method for the manufacture of high-frequency dielectric ceramics having high unloaded Q and low loss.

2. Description of the Prior Art

Generally dielectric resonators and dielectric substrates which are used in circuits for signals in the region of high-frequency waves such as microwave and millimeter wave are desired to be made of dielectric ceramics having high unloaded Q. Incidentally, the frequencies used in communications are suddenly growing in level in recent years. The satellite broadcast using waves in the SHF band is entering the stage of practical utilization. Thus, the desirability of developing dielectric ceramics possessed of still higher unloaded Q and low loss has come to be urged with growing enthusiasm.

The conventional low-loss dielectric ceramics for use with high-frequency waves have unloaded Q at levels falling in the range of 3,000 to 7,000. Only in very recent years has the manufacture of low-loss dielectric ceramics having unloaded Q at levels exceeding 10,000 materialized.

Known $BaO-MgO-Ta_2O_5$ type dielectric ceramics, particularly those containing no additive, have unloaded Q at levels of about 4,000 (see Japanese Patent Application Laid-open SHO 53(1978)-60,544). Even the $BaO-MgO-Ta_2O_5$ type ceramics incorporating additive elements have unloaded Q at low levels, such as 4,360 in the case of ceramics of the composition of $3BaO.x-MgO.(1-x)-znO.Ta_2O_5$ disclosed in Japanese Patent Application Laid-open SHO 54(1979)-77,000 and 4,090 in the case of ceramics of the composition of $3BaO.x-MgO.(1-y)Nb_2O_5.yTa_2O_5$ disclosed in Japanese Patent Application Laid-open SHO 54(1979)-71,400. Thus, these ceramics are not suitable as materials for communications in the SHF band.

For the purpose of improving the $BaO-MgO-Ta_2O_5$ type ceramics in unloaded Q, there has been proposed a method which comprises adding a small amount of Mn to an oxide of the Perovskite configuration consisting preponderantly of $Ba(Mg_{1/3}Ta_{2/3})O_3$ and sintering the resultant mixture (see Japanese Patent Application Laid-open SHO 53(1983)-206,003). This method indeed, is capable of producing dielectric ceramics having unloaded Q at levels exceeding 10,000. The incorporation of such an extraneous element as Mn, however, entails the possibility that the process of manufacture of ceramics will be complicated and, in the course of the addition, impurities unnecessary and even detrimental to the characteristics of ceramics will find their way into the ceramics. Further, this method has the disadvantage that for the sake of quality control of products, special care must be paid to the control of the amount of addition and to the uniform distribution of added Mn. This method, therefore, is unfit for mass production of the ceramics under discussion. Incidentally, the aforementioned $BaO-MgO-Ta_2O_5$ type dielectric ceramics are invariably manufactured by the conventional method of firing, i.e. by firing a green compact of a prescribed composition at a temperature roughly in the range of 1,000° to 1,500° C. In this case, no due respect has been accorded to the course of temperature elevation to the prescribed firing temperature. For feat of breakage of ceramics by sudden heating, it has been customary heretofore to place a green compact in the furnace and heat the green compact generally at a temperature increasing rate of 2° to 20° C./minute so as to elevate the internal temperature of the furnace gradually from room temperature to the prescribed temperature. The conventional firing method itself has the disadvantage that the course of temperature elevation which calls for a much as several hours' time poses itself as a hindrance to the improvement of production efficiency.

In accordance with the conventional method, $BaO-MgO-Ta_2O_5$ type dielectric ceramics having unloaded Q at high levels cannot be easily obtained unless such an additive element as Mn is incorporated therein as described above. The method involving the use of Mn or other similar additive element inevitably entails various drawbacks such as, for example, complication of the process of manufacture. Moreover, the conventional firing method has not been free from the problem that the lengthy course of temperature elevation impairs the efficiency and productivity.

SUMMARY OF THE INVENTION

It is, therefore, an object of this invention to provide a method for the manufacture of $BaO-MgO-Ta_2O_5$ type dielectric ceramics possessing a high level of unloaded Q and low loss at high frequency without requiring incorporation of any additive element, which enjoys high productional efficiency and ease of quality control.

After a diligent study directed to elucidation of the process of firing, the inventors have found that the object described above is able to be accomplished by the following method.

To be specific, this invention aims to provide a method for the manufacture of high-frequency dielectric ceramics which comprises heating a green compact of a composition represented by the general formula: $xBaO.yMgO.zTa_2O_5$ (wherein x, y, and z satisfy $0.5 \leq x \leq 0.7$, $0.15 \leq y \leq 0.25$, $0.15 \leq z \leq 0.25$, and $x+y+z=1$) to a temperature in the range of 1,500° to 1,700° C. at a temperature increasing rate of 100° to 1,600° C./minute and subsequently retaining the green compact at the temperature for not less than 30 minutes.

The other objects and characteristic features of the present invention will become apparent to those skilled in the art as the disclosure is made in the following description of a preferred embodiment of the invention, as illustrated in the accompanying drawings.

BRIEF DESCRIPTION OF THE DRAWINGS

The accompanying FIGURE illustrates a typical firing apparatus to be used in working the method of this invention.

DETAILED DESCRIPTION OF THE INVENTION

The green compact to be used in the method of this invention is obtained by mixing barium carbonate, magnesium oxide, and tantalum pentoxide, for example, in proportions calculated to produce $BaO-MgO-Ta_2O_5$ ceramics of a prescribed composition, calcining the resultant mixture, thereby converting all the components thereof wholly into oxides, and compression molding the calcined mass. Although the method used for the compression molding is not specifically defined, the method resorting to isotropic pressure application proves advantageous. Although the pressure used for the compression molding is not specifically defined, it is desired to exceed 1,000 kg/cm$^2$.

The composition of the aforementioned green compact is represented by the general formula indicated above, in which the fractions x, y, and z must be as defined above. If any one of the three fractions x, y, and z fails to fall in the defined range, the produced ceramics lacks compaction of texture, offers insufficient mechanical strength, and possesses a low level of unloaded Q. Preferably, the fractions x, y, and z fall in the respective ranges of $0.56 \leq x \leq 0.64$, $0.18 \leq y \leq 0.22$ and $0.18 \leq z \leq 0.22$.

In the method of this invention, the temperature increasing rate is required to fall in the range of 100° to 1,600° C./minute, preferably 200° to 1,600° C./minute. If the temperature increasing rate is less than 100° C., the sintering fails to proceed amply and the produced ceramic, therefore, possesses only a low level of unloaded Q. If the temperature increasing rate exceeds 1,600° C./minute, the ceramic is broken.

The firing temperature in the method of this invention is required to fall in the range of 1,500° to 1,700° C., preferably 1,550° to 1,650° C. If this temperature is less than 1,500° C., the sintering fails to proceed amply and the produced ceramic, therefore, offers insufficient mechanical strength and possesses only a low level of unloaded Q. If the firing temperature exceeds 1,700° C., the ceramic under treatment reacts with a container made of platinum, the container of which enjoys high stability at elevated temperatures and finds popular adoption as a vessel for retaining ceramics during the firing process, and the produced ceramic suffers from deficient properties.

In the method of this invention, the ceramic under treatment is required to be retained at the aforementioned firing temperature for not less than 30 minutes. If the firing time is less than 30 minutes, the produced ceramic has been sintered insufficiently and often suffers from deficiency in both mechanical strength and unloaded Q.

The method of this invention is desired to be worked in an inert atmosphere such as of nitrogen gas or argon gas or in an oxidative atmosphere such as of air or oxygen gas.

One of the characteristics of this invention resides in the fact that the temperature elevation is effected at such a high rate as 100° to 1,600° C./minute. This rapid temperature elevation can be effected in various ways. A method which comprises suspending a green compact down into a heated core tube of a vertical furnace by means of a supporting member such as, for example, a basket made of platinum and possessed of resistance to thermal shock, a method which comprises pushing a green compact up into a heated core tube of the same vertical furnace by means of a supporting base made of platinum, and a method which resorts to use of an image furnace utilizing an infrared lamp, a xenon lamp, or the sunlight as its heat source are examples. In the methods cited above, the first method which has the green compact suspended down into the heated core tube is simple and advantageous.

The present invention will now be described more specifically below with reference to a working example and a comparative experiment. This invention is not limited to the working example so cited but may be practised otherwise without departing from the spirit of the invention disclosed herein.

In the working example and the comparative experiment cited below, the heating and firing of a green compact were carried out with an apparatus schematically depicted in FIG. 1. With reference to FIG. 1, a core tube 1 is disposed in the central part of a cylindrical resistance heating furnace 2. A lid 3 of the core tube 1 is suspended from a platinum wire 4 resistant to thermal shock. This platinum wire 4 is connected to a cable 5, which is led to a drive unit 6. To the other end of the cable 5 is attached a balancer 7. To the bottom part of the lid 3 is attached a platinum wire 9 adapted to suspend a basket 8 made of platinum. The drive unit 6 is provided with a speed-variable injection motor 10 which is adapted to vary the speed of vertical motion of the platinum basket 8 through the medium of the cable 5 and the platinum wires 4 and 9. In the arrangement described above, the platinum basket 8 is brought to a stop at the uniformly heated part of the core tube 1 at the time that the lid 3 is lowered to close the core tube 1. The drive unit 6 is provided on the lower side thereof with an aluminum heat-shielding plate 11 adapted to protect the drive unit 6 against the heat of the furnace.

In working the method of this invention with the apparatus described above, the uniformly heated part of the core tube 1 of the furnace is set to the prescribed firing temperature in advance and the platinum basket 8 holding therein the green compact to be treated is lowered from the upper end of the core tube to the uniformly heated part thereof. The temperature increasing rate of the green compact can be regulated by suitably varying the descending speed of the platinum basket 8 with the motor 10.

EXAMPLE

As raw materials, powders of barium carbonate, magnesium oxide, and tantalum pentoxide each of purity of 99.9% were used. First, these three substances were mixed in prescribed proportions. In Examples 1 through 13, these substances were weighed in amounts calculated to produce ceramics of such compositions as to give the respective numerical value indicated in Table 1 to the fractions x, y, and z in the general formula, $XBaO \cdot yMgO \cdot zTa_2O_5$, (these numerical values of the fractions x, y, and z invariably falling in the ranges of $0.5 \leq x \leq 0.7$, $0.15 \leq y \leq 0.25$, and $0.15 \leq z \leq 0.25$). In a pot made of polyethylene and containing balls having a resin coating on the surface, each set of the three substances described above and pure water added thereto were mixed for 16 hours. The resultant mixture was removed from the pot, dried at 120° C. for 12 hours, then compression molded into a mass under pressure of 700 kg/cm$^2$, and calcined on a platinum plate in air at 900° to 1,300° C. for two hours to effect convertion of the carbonate in the mixture into oxide. The calcined mass was crushed in an alumina mortar and the resultant particles were passed through a sieve of 42 mesh for uniformization of grain size. The powder so obtained was subjected to primary molding under pressure of 500 kg/cm$^2$ to produce a disc 10 mm in diameter and about 5 mm in thickness. The disc was compression molded under isotropic pressure of 2,000 kg/cm$^2$. The green compact so produced was placed in the basket of platinum suspended with the platinum wire and inserted downwardly to the uniformly heated part of the core tube of the furnace in the apparatus shown in FIG. 1. In each example, the uniformly heated part of the core tube of the furnace was retained at a varying firing temperature falling in the range of 1,500° to 1,700° C. as indicated in Table 1. The temperature increasing rate of the green compact in each example was made to fall within the range of 100° to 1,600° C./minute as indicated in Table 1 by regulating the descending speed of the platinum basket. After the temperature of the green compact reached the prescribed firing temperature, the green compact was fired at that prescribed temperature for a period of 30 minutes to four hours. The atmosphere for the firing was prepared by feeding oxygen gas, nitrogen gas, or air at a flow volume of 400 cc (STP)/minute via the bottom of the core tube. The atmosphere was formed of air in Examples 1 through 11, of oxygen gas in Example 12, and of nitrogen gas in Example 13.

The ceramics so produced were tested for dielectric constant ($\epsilon$) and unloaded Q (Qu) by the dielectric resonator method using a frequency in the neighborhood of 11 GHz. The results are shown in Table 1.

COMPARATIVE EXPERIMENT

Ceramics of Comparative Experiments 1 through 7 were produced by following the procedure of Example, except that the compositions of the ceramics or the firing conditions deviated from the ranges specified by this invention. Comparative Experiments 1 and 2 involved deviations of ceramics composition, Comparative Experiments 3 and 4 deviations of temperature increasing rate, Comparative Experiments 5 and 6 deviations of firing temperature, and Comparative Experiment 7 a deviation of retention time at firing temperature respectively from the respective ranges defined by the present invention. The atmosphere for the firing was invariably formed of air.

The ceramics consequently obtained were tested for dielectric constant and unloaded Q in the same manner as in Example. The results are shown in Table 1. The ceramics obtained in Comparative Experiments 3 and Comparative Experiment 5 were not subjected to the test because the ceramics in the former experiment sustained a crack and that in the latter experiment reacted with the platinum basket.

TABLE 1

| | Composition | | | Temperature increasing rate (°C./min.) | Firing temperature (°C.) | Retention time (hr) | $\epsilon$ | Qu |
|---|---|---|---|---|---|---|---|---|
| | x | y | z | | | | | |
| Example | | | | | | | | |
| 1 | 0.61 | 0.17 | 0.22 | 1,000 | 1,650 | 1 | 23.0 | 8,500 |
| 2 | 0.58 | 0.23 | 0.19 | 1,000 | 1,650 | 1 | 23.5 | 8,700 |
| 3 | 0.58 | 0.21 | 0.21 | 1,000 | 1,650 | 1 | 22.9 | 8,900 |
| 4 | 0.6 | 0.2 | 0.2 | 1,475 | 1,500 | 3 | 22.8 | 9,100 |
| 5 | 0.6 | 0.2 | 0.2 | 1,600 | 1,650 | 0.5 | 24.2 | 10,200 |
| 6 | 0.6 | 0.2 | 0.2 | 1,000 | 1,700 | 1 | 24.1 | 11,500 |
| 7 | 0.6 | 0.2 | 0.2 | 1,600 | 1,650 | 4 | 24.0 | 13,500 |
| 8 | 0.6 | 0.2 | 0.2 | 325 | 1,650 | 4 | 24.3 | 14,000 |
| 9 | 0.6 | 0.2 | 0.2 | 100 | 1,650 | 4 | 23.9 | 7,900 |
| 10 | 0.62 | 0.19 | 0.19 | 325 | 1,650 | 4 | 23.3 | 11,000 |
| 11 | 0.6 | 0.2 | 0.2 | 1,000 | 1,600 | 4 | 24.0 | 10,800 |
| 12 | 0.6 | 0.2 | 0.2 | 1,000 | 1,600 | 4 | 24.2 | 12,100 |
| 13 | 0.6 | 0.2 | 0.2 | 1,000 | 1,600 | 4 | 23.9 | 10,000 |
| Comparative Experiment | | | | | | | | |
| 1 | 0.48 | 0.26 | 0.26 | 1,000 | 1,650 | 1 | 18.2 | 4,200 |
| 2 | 0.72 | 0.14 | 0.14 | 325 | 1,650 | 1 | 14.0 | 3,300 |
| 3 | 0.6 | 0.2 | 0.2 | 1,625 | 1,650 | 1 | (Crack) | |
| 4 | 0.6 | 0.2 | 0.2 | 3.3 | 1,650 | 4 | 18.9 | 2,100 |
| 5 | 0.6 | 0.2 | 0.2 | 325 | 1,750 | 1 | (Reaction with platinum basket) | |
| 6 | 0.6 | 0.2 | 0.2 | 325 | 1,450 | 1 | 11.4 | 1,900 |
| 7 | 0.6 | 0.2 | 0.2 | 1,000 | 1,500 | 0.3 | 20.0 | 4,000 |

It is noted from the results of the working examples that the BaO-MgO-Ta$_2$O$_5$ type dielectric ceramics obtained in accordance with the present invention without incorporation of any extraneous element such as Mn possessed unloaded Q at high levels and exhibited values of dielectric constant $\epsilon$ exceeding about 23 and levels of unloaded Q exceeding 8,000 at a frequency in the neighborhood of 11 GHz suitable for satellite communications. Thus, they prove to make outstanding high-frequency low-loss dielectric ceramic devices. Further, the method of this invention for the manufacture of such ceramics is simple. Since it relies for firing of a green compact upon rapid temperature elevation, it permits the time for temperature elevation which used to run for several hours in the conventional method to be cut to several minutes. Thus, the firing process can be notably simplified and expedited. Compared with the conventional method which necessitates incorporation of an additive element, the method of the present invention enjoys simplification of process, improvement of quality control, and enhancement of operational efficiency.

What is claimed is:

1. A method for the production of BaO-MgO-Ta$_2$O$_5$ type dielectric ceramic which contains no Mn, said method comprising the steps of
    (a) providing a green compact composed of a material consisting essentially of xBaO.yMgO.zTa$_2$O$_5$, wherein x, y and z satisfy the following relationships: $0.56 \leq x \leq 0.64$, $0.18 \leq y \leq 0.22$, $0.18 \leq z \leq 0.22$, and $x+y+z=1$, said material containing no Mn, by combining suitable amounts of BaCO$_3$, MgO and Ta$_2$O$_5$ to form a mixture, calcinating the mixture and subsequently compression molding the calcined mixture,
    (b) heating said green compact at a rate of 100° C. to 1,600° C. per minute to a temperature of 1,500° C. to 1,700° C., and (c) maintaining said heated green compact at between 1,500° C. and 1,700° C. for at least 30 minutes.

2. A method according to claim 1, wherein step (b) is effected by suspending said green compact into a heated core tube of a vertical furnace by means of a supporting member made of platinum.

3. A method according to claim 1, wherein step (b) is effected by pushing said green compact up into a heated core tube of a vertical furnace by means of a supporting member made of platinum.

4. A method according to claim 1, wherein step (b) is carried out with an image furnace.

5. A method according to claim 4, wherein the heat source for said image furnace is an infrared lamp, a xenon lamp, or the sunlight.

6. A method according to claim 1, wherein in step (b) the green compact is heated at a rate of 200° C. to 1,600° C. per minute.

7. A method according to claim 1, wherein in step (b) the green compact is heated to a temperature of 1,500° C. to 1,650° C.

8. A method according to claim 1, wherein steps (b) and (c) are carried out in an inert atmosphere.

9. A method according to claim 8, wherein said inert temperature is composed of nitrogen of argon gas.

10. A method according to claim 1, wherein steps (b) and (c) are carried out in an oxidizing atmosphere.

11. A method according to claim 10, wherein said oxidative atmosphere is composed of air or oxygen gas.

12. A method according to claim 1, wherein in step (a) said compression molding is accomplished under a pressure of at least 1,000 kg/cm$^2$.

* * * * *